Sept. 28, 1948.　　　　R. S. TURNER　　　　2,450,213
SEAT ANCHORING DEVICE

Filed Oct. 30, 1944　　　　　　　　　　　2 Sheets-Sheet 1

INVENTOR.
Robert S. Turner
BY Loyal J. Miller
Attorney

Patented Sept. 28, 1948

2,450,213

UNITED STATES PATENT OFFICE 2,450,213

SEAT ANCHORING DEVICE

Robert S. Turner, Oklahoma City, Okla.

Application October 30, 1944, Serial No. 561,133

6 Claims. (Cl. 45—137)

My invention relates to means for anchoring seats to floors, and more particularly to the anchoring of seats in public conveyances, such as street cars, busses, and the like.

The prime object of the invention is to provide a device of this class which will permit a vehicle seat to be easily and quickly released from the floor upon which it is mounted.

A further object is to provide a seat anchoring device which requires no special tools for the installation or release of the seat.

Another object is to provide a device of this class which may be adjusted as to tension without the removal of the seat, and without releasing the device from its seat anchoring position.

A still further object is to provide a seat anchoring device which is so compact that it may be concealed in a usual hollow seat leg.

Yet another object is to provide an anchoring device which may be positively locked against release which might occur through vibration of the vehicle.

Other objects will be apparent from the following description when taken in connection with the accompanying two sheets of drawings, wherein.

Like characters of reference designate like parts in all the figures wherein they occur.

In the drawings.

Figure 1:
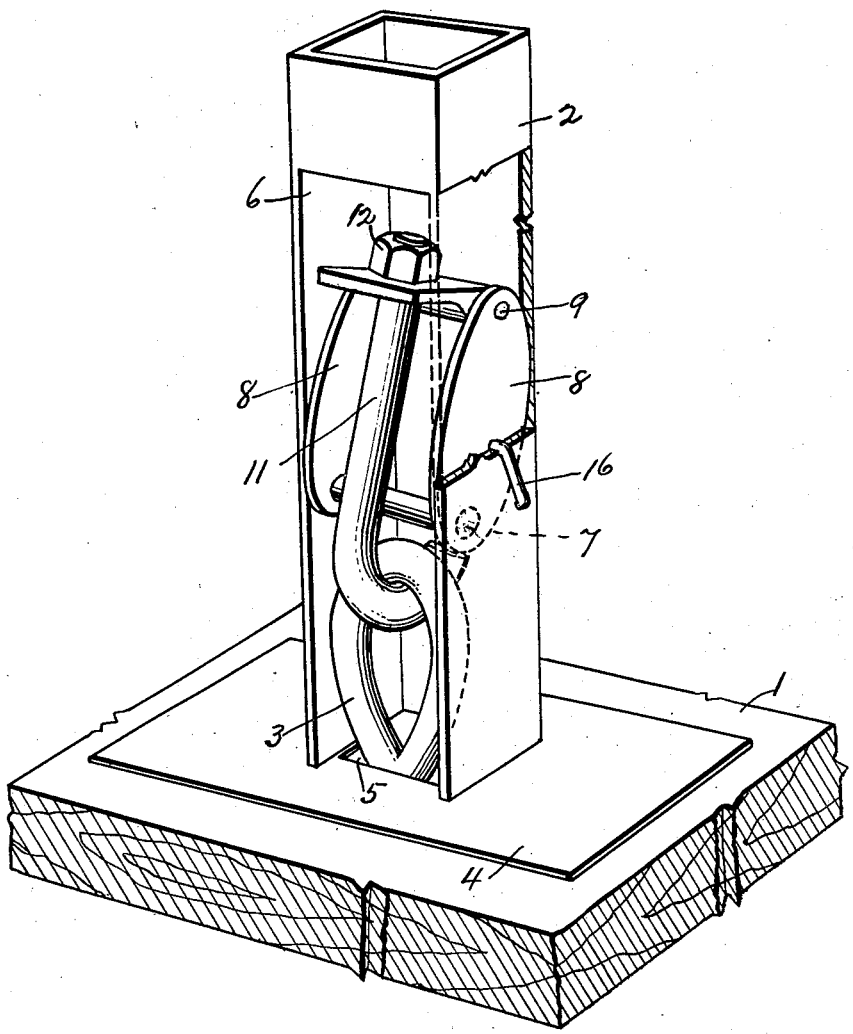
Figure 1 is a fragmentary perspective view of a usual vehicle seat leg anchored to the floor by the device of the present invention.
Figure 3:
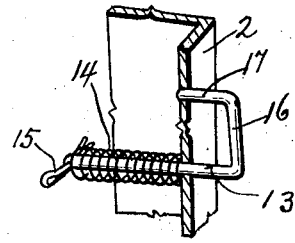

Reference numeral 1 indicates a board of a usual floor upon which it is desired to anchor a hollow leg 2 of a seat, not shown. For the purpose of anchoring such seat leg an eye-bolt 3 is provided in the board 1 and has its loop projecting thereabove. A metal plate 4 having an opening 5 for fitting over the eye-bolt 3 may be provided if desired.

As a means for anchoring such seat leg 2, the lower portion of one side of the leg is cut away to form a window 6. Adjacent the lower end of the leg 2 there is provided a transverse pivot-pin 7, to which are rigidly mounted the similar ends of two parallel ears 8. The pin 7 extends through the opposite side walls of the seat leg 2 and is pivoted with relation to said leg. The free ends of the ears 8 are connected by a horizontal pivot-pin 9 upon which is pivotally mounted a crank 10 having a through perforation which receives a hook 11. A nut 12 is the means for attaching the shank of the hook 11 adjustably to the crank 10.

Figure 2:
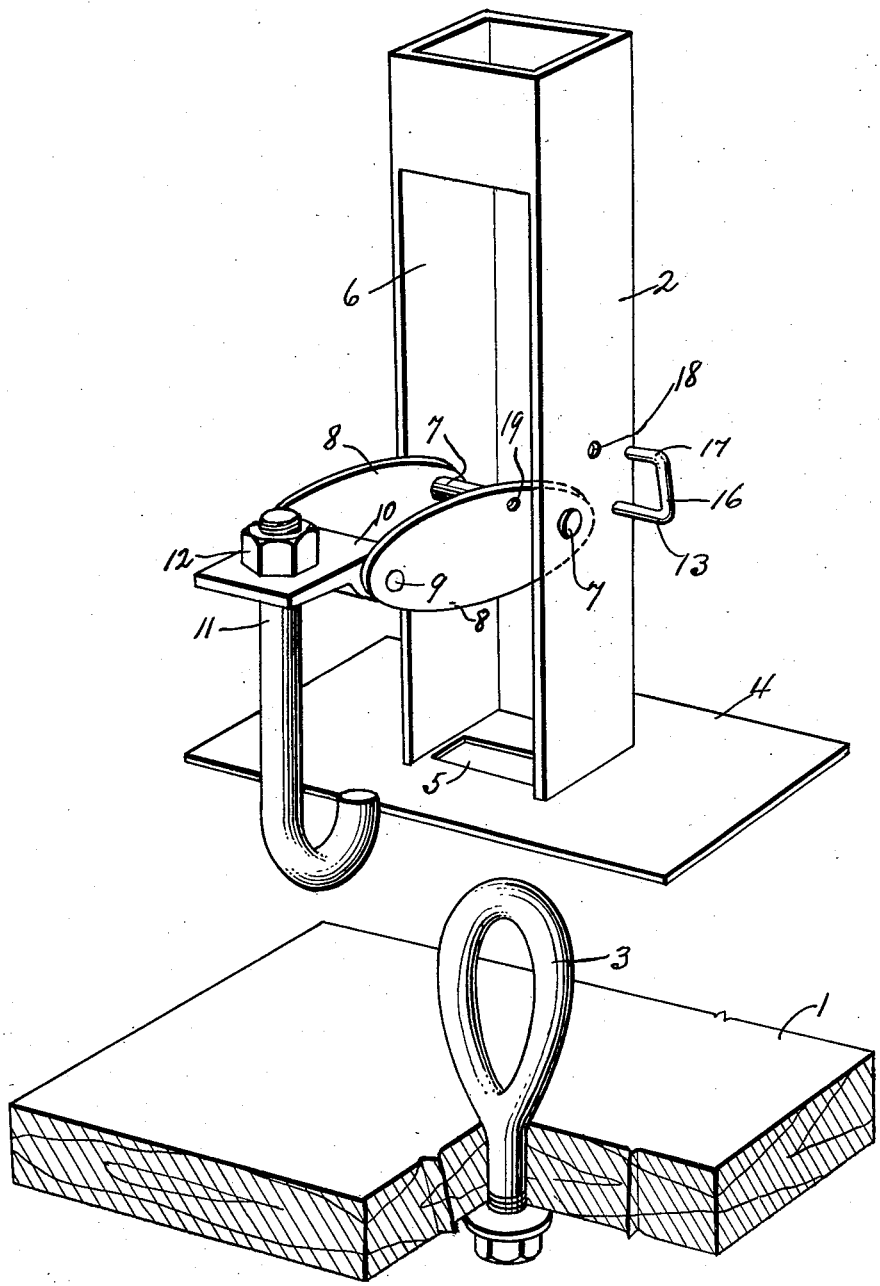
Figure 2 is a similar view showing the device in its released condition, the seat leg being shown as raised above the floor; and, Figure 3 is a fragmentary vertical sectional view of the seat leg, detailing the locking portion of the device.

As best seen in Figure 2 the plate 4 is passed over the eye-bolt 3 and the leg 2 is placed around the eye-bolt. The hook 11 is then inserted into the eye-bolt 3 and the outer ends of the two ears 8 are moved upwardly into the leg 2 to substantially the position illustrated in Figure 1. When in this position, the pivot pin 9 is farther within the leg 2 than is the pivot-pin 7 and consequently the tension of the hook 11 is over-center so that there is no tendency for the ears 8 to work toward the open position which is shown in Figure 2.

When the mechanism is in clamping position, as shown in Figure 1, the shank of the hook 11 is disposed at an angle to the vertical, and its point of engagement with the crank 10 lies inside the leg 2 at a point beyond the vertical axis of the eye 3, and also beyond the horizontal axis of the pivot pin 7. When in such clamped position, the hook shank is then lying against the pivot pin 7, with its upper end beyond center with relation to the pin 7. Even though the crank 10 is then disposed at a slight upward angle, there is no tendency for the ears 8, crank 10 and the upper end of the shank to swing out of the leg 2. In fact, they are then locked in position by the clamping tension which was created by swinging them over dead center with relation to the eye 3 and pivot pin 7.

It may be seen that a common end wrench may be used to adjust the nut 12 whether or not the mechanism is in its clamping position.

As a means for locking the ears in their clamped position, as shown in Figure 1, one side of the leg 2 is pierced by a rod 13 surrounded by a compression spring 14 held in place by a suitable detent 15. The rod 13 has an upwardly bent portion 16 outside of the leg 2 and has a return bent portion 17 which is adapted to pass into a perforation 18 in the leg 2 and also into a perforation 19 in the nearest ear 8. When the portion 17 of the rod 13 extends through the perforations 18 and 19, there can be no movement of the ears 8 with relation to the leg 2.

From the former description it may be seen that a compact leg anchoring mechanism has been shown which may be entirely confined within any hollow leg and which will positively act to anchor the seat leg 2 and floor member.

In order to release the leg 2 from the floor member 1 it is only necessary to pull outwardly upon the portion 16 of the rod 13 and to then pull forwardly upon the nut 12. The hook 11 may then be swung out of the eye-bolt 3 so that the leg may be removed from the floor member.

Obviously the invention could well be embodied in forms of slight variation and I therefore do not wish to be limited further than I am confined by the scope of the appended claims.

I claim:

1. The combination with a floor member having an upwardly projecting eye, and with a hollow leg seated over said eye, of: parallel members pivoted at their similar ends to the leg; a crank member pivoted between the opposite ends of said members; and a hook engaging said eye and having the end of its shank engaged with said crank, said crank adapted to swing with the parallel members, and to carry said shank end beyond the pivot point of said members to said leg.

2. Organization as described in claim 1, and means for adjusting the hook longitudinally with relation to the cam member.

3. The combination with a floor member having an upwardly projecting eye, and with a hollow leg having one open side and adapted to be seated over said eye, of: an elongated member having one end pivotally connected within the leg, whereby its other end may be swung outwardly from within said leg; a crank member pivotally connected to said other end, and adapted to swing toward said pivoted end; and a hook engaging said eye and having the end of its shank connected to the crank, said crank adapted to swing with the elongated member, and to carry said shank end beyond the pivot point of said elongated member to said leg.

4. Organization as described in claim 3, and means for adjusting the hook longitudinally with relation to said crank member.

5. Organization as described in claim 1, and means for locking the parallel members against pivotal movement with relation to the leg.

6. Organization as described in claim 3, and means for locking the elongated member against pivotal movement with relation to said leg.

ROBERT S. TURNER.

REFERENCES CITED

The following references are of record in the file of this patent:

UNITED STATES PATENTS

| Number | Name | Date |
|---|---|---|
| 821,319 | Swan | May 22, 1906 |
| 1,158,247 | Lindblom | Oct. 26, 1915 |
| 1,496,206 | Burlin | June 3, 1924 |
| 2,311,791 | Turner | Feb. 23, 1943 |
| 2,327,003 | Turner | Aug. 17, 1943 |

FOREIGN PATENTS

| Number | Country | Date |
|---|---|---|
| 453,726 | Great Britain | Sept. 17, 1936 |